United States Patent Office 3,591,540
Patented July 6, 1971

3,591,540
STABLE, FREE FLOWING PEROXIDE COMPOSITIONS
Arras M. Praskach, Edison, N.J. 08817
No Drawing. Continuation-in-part of application Ser. No. 567,385, July 25, 1966. This application Nov. 12, 1969, Ser. No. 876,040
Int. Cl. C07c 73/06
U.S. Cl. 260—23
8 Claims

ABSTRACT OF THE DISCLOSURE

A stable free flowing peroxide composition is disclosed consisting essentially of about 45–75 wt. percent of particulate benzoyl peroxide, about 2–30 wt. percent of an inert particulate polyolefin, about 0.05–5 wt. percent of particulate metallic soap of Group II and from about 12–25 wt. percent of water.

This invention relates to new and useful stable, free flowing, organic peroxide compositions.

This application is a continuation-in-part of copending application Ser. No. 567,385 filed July 25, 1966 now abandoned.

The utility of organic peroxide formulations for curing and polymerization is well known. There are many areas of application where very fine particulate dispersions of the peroxides are required, e.g., polyester curing, silicon rubber curing, preparation of adhesives, etc. For many end use applications, very fine particulate material is needed to give very uniform catalyst dispersions prior to curing.

The hazardous nature of pure benzoyl peroxide is well known, i.e., it is very sensitive to shock, friction, heat, static discharge and contamination, and can decompose with extreme violence. Fine particle sizes, required as indicated above, increase hazards mentioned.

Benzoyl peroxide is conventionally prepared by the reaction of benzoyl chloride with aqueous sodium peroxide, utilizing a dispersing agent and a temperature of about −20 to +40° C. The sodium chloride produced dissolves in the reaction medium, while the benzoyl peroxide formed separates as a precipitate.

It is known that relatively fine particles of benzoyl peroxide can be obtained by controlling the reaction conditions. These controls are empiric in nature such as an extent of agitation, temperature, etc. Screening and/or grinding the wet product are then employed. In either case, the hazardous drying and handling of dry benzoyl peroxide is involved.

It has now surprisingly been found that the desired stable, free flowing benzoyl peroxide formulations can be prepared by starting with the wet filter cake from the synthesis reaction, which already contains the organic peroxide in the desired particle size range. The wet filter cake is a concentrated aqueous dispersion of the organic peroxide, i.e., contains from about 50 to 85 wt. percent benzoyl peroxide. This concentrated dispersion is then admixed with an inert particulate solid, and preferably also a metallic soap, both also in the particulate form. The resultant formulation is free flowing and stable, i.e., retains the water uniformly dispersed.

The formulations of this invention are considerably more resistant to the hazards of the organic peroxides previously referred to. In addition, the stability of the formulations is outstanding, even after being on the shelf for long periods, and thus the formulations are especially adapted for the uses previously described.

The present compositions contain as the active ingredient, benzoyl peroxide. The techniques of this invention are applicable however to formulations of other organic peroxides that present similar handling problems. The particle size of the benzoyl peroxide is such that at least 90 wt. percent has a maximum particle size diameter of 600 microns, and preferably is in the range of 40 to 600 microns.

Admixed in the formulations of this invention is an inert, particulate solid diluent. Particularly useful are the microfine polyolefin powders such as the microfine low density polyethylene, Microthene FN–500. Other polyolefin powders that have been found to be useful are high density polyethylene, polypropylene, the solid non-rubbery copolymers of ethylene and propylene and other copolymers of ethylene and propylene, such as with vinyl acetate, wherein the proportion of polyethylene or polypropylene is sufficiently high that the copolymer has essentially the properties of polyethylene or polypropylene. The terms polyethylene and polypropylene as employed herein are defined to include those copolymers that have essentially the surface properties of polyethylene or polypropylene. While the optimum particle size range for the particulate polyolefin powder appears to be in the range of 8–30 microns, polyolefin powders of large size can be employed usefully up to a diameter of 150 microns. The melt index of the polyolefin is not critical providing that it is a solid. It is the surface property that is the active feature. The polyolefins are employed in an amount of from 2 to 30 wt. percent of the composition. The extent of decrease in benzoyl peroxide handling sensitivity is indeed surprisingly based on the indicated amounts of diluents.

The aqueous dispersion as previously stated is preferably admixed with from 0.05 to 5 wt. percent of a metallic soap. The preferred metallic soap is zinc stearate although other stearates, palmitates, myristates and laurates can be used. In general, the metallic soaps of metals of Group II of the Periodic Table can be employed. Group II of the Periodic Chart as used herein is not means to indicate soaps of beryllium, mercury and radium which are not available commercially. It is meant to include lithium soaps. Although lithium is formally a member of Group I, the properties of its soaps resemble those of Group II rather than Group I. In particular, soaps such as zinc stearate, magnesium stearate, calcium laurate, zinc palmitate, magnesium myristate, strontium stearate, barium palmitate, cadmium laurate and lithium stearate are useful. The terms for the fatty acids as used herein are used in their common commercial sense. Thus the stearates may be actually a mixture of several of the higher fatty acids (which herein refers to those fatty acids with carbon atoms 12 through 18) and in some cases the name does not indicate the fatty acid present in the largest percentage. The particle size of the soap is in the same general range as the polyolefins and are generally useful in their commercially available range of between 3 and 100 microns, usually 20 to 50 microns.

The final formulations prepared will thus have a component distribution about as follows:

| | Wt. percent range |
|---|---|
| Water | 12–30 |
| Benzoyl peroxide | 45–75 |
| Metallic soap | 0.05–5 |
| Polyolefin | 2–30 |

The method of mixing the components is not critical. They are simply combined and blended in conventional equipment such as tumble mixers, ribbon blenders, etc.

It should be recognized that other materials can be added to the formulations of this invention, such as small quantities of anti-caking agents, free flowing agents, etc.

This invention will be better understood by reference to the following examples:

Example 1.—70% formulation benzoyl peroxide:
- Benzoyl peroxide powder, assay 74%,[a] particle size avg. 210 microns — 93.5
- Zinc stearate — 3.0
- Low density polyethylene powder,[b] (size range 8–30 microns) — 3.5

Example 2.—60% formulation benzoyl peroxide:
- Benzoyl peroxide powder, assay 74%,[a] particle size avg. 210 microns — 81
- Zinc stearate — 3
- Low density polyethylene powder [b] (size range 8–30 microns) — 16

Example 3.—50% formulation benzoyl peroxide:
- Benzoyl peroxide powder, assay 65%,[a] particle size avg. 210 microns — 76
- Zinc stearate — 4
- Low density polyethylene powder [b] (size range 8–30 microns) — 20

Example 4.—70% formulation benzoyl peroxide:
- Benzoyl peroxide powder, assay 77%,[a] particle size avg. 120 microns — 91
- Magnesium stearate — 1
- Low density polyethylene powder [c] (size range 8–30 microns) — 8

Example 5.—70% formulation benzoyl peroxide:
- Benzoyl peroxide powder, assay 77%,[a] particle size avg. 210 microns — 91
- Calcium laurate — 3
- High density polyethylene powder,[d] (avg. size 100 microns) — 6

Example 6.—70% formulation benzoyl peroxide:
- Benzoyl peroxide powder, assay 77%,[a] particle size avg. 210 microns — 91
- Strontium palmitate — 2
- Polypropylene powder [e] (avg. size 35 microns) — 7

Example 7.—45% formulation benzoyl peroxide:
- Benzoyl peroxide powder, assay 69%,[a] particle size avg. 400 microns — 65
- Barium stearate — 5
- Copolymer of ethylene and propylene powder [f] (avg. size 150 microns)[d] — 30

Example 8.—75% formulation benzoyl peroxide:
- Benzoyl peroxide powder, assay 85%,[a] particle size avg. 40 microns — 88.5
- Zinc myristate — 0.5
- Low density polyethylene powder [b] (size range 8–30 microns) — 11

[a] Water constitutes all but a trace of the remainder.
[b] Microthene FN 500—a product of U.S. Industrial Chemicals.
[c] Microthene FN 510—a product of U.S. Industrial Chemicals.
[d] Obtained by sieving polypropylene powder.
[e] Hercoflat 135—a product of the Hercules Company.
[f] 10% ethylene, 90% propylene.

The formulations exemplified above are utilized in curing various polyester resin and silicon rubbers, and give very satisfactory end products.

The advantages of this invention will be apparent to those skilled in the art. Among these are the making available to the trade of stable, free flowing, organic peroxide formulations and the method of their preparation.

It is to be understood that this invention is not limited to the specific examples which have been offered merely as illustrations, and that modifications can be made without departing from the spirit thereof.

What is claimed is:

1. A stable free flowing peroxide composition consisting essentially of from about 45–75% of particulate benzoyl peroxide in which the particle size is at least 90% in the range of 40–60 microns; from about 2–30 wt. percent of a solid polyolefin powder having a particle size of from 8–150 microns, said polyolefin selected from the group consisting of polyethylene, polypropylene and solid co-polymers thereof; from about 0.05–5 wt. percent of a particulate metallic soap of a higher fatty acid in which the metal is selected from the group consisting of lithium, barium, cadmium, calcium, magnesium, strontium and zinc and the higher fatty acid consists essentially of fatty acids of from 12 through 18 carbon atoms.

2. The composition of claim 1 in which the metallic soap is selected from the group consisting of a soap of zinc, calcium and magnesium.

3. The composition of claim 2 in which the polyolefin is polyethylene.

4. The composition of claim 3 in which the particle size of the polyethylene is from 8–35 microns.

5. The composition of claim 4 in which the metallic soap is zinc stearate.

6. The composition of claim 2 in which the polyolefin is polypropylene.

7. The composition of claim 6 in which the particle size of the polyolefin is from 8–30 microns.

8. The composition of claim 7 in which the metallic soap is zinc stearate.

References Cited

UNITED STATES PATENTS

| | | | |
|---|---|---|---|
| 3,362,924 | 1/1968 | Eastman | 260—23 |
| 3,466,255 | 9/1969 | Faerber et al. | 260—23 |

DONALD E. CZAJA, Primary Examiner

D. J. BARRACK, Assistant Examiner

U.S. Cl. X.R.

260—29.6OL, 610A, 610D